United States Patent [19]
Du Bosque, Jr. et al.

[11] 3,885,207
[45] May 20, 1975

[54] OPTIMIZED EDITING SYSTEM FOR A SERVO CONTROLLED PROGRAM RECORDING SYSTEM

[75] Inventors: Clayton Du Bosque, Jr., New Canaan, Conn.; Jeffrey Lowenson, Annandale, Va.

[73] Assignee: AMF Incorporated, White Plains, N.Y.

[22] Filed: Jan. 17, 1973

[21] Appl. No.: 324,409

[52] U.S. Cl. .................. 318/568; 318/561; 360/13; 346/33 MC
[51] Int. Cl. .......................................... G05b 19/42
[58] Field of Search .............. 318/568, 561; 360/13; 346/33 MC

[56] References Cited
UNITED STATES PATENTS

| | | | |
|---|---|---|---|
| 2,755,422 | 7/1956 | Livingston | 318/568 |
| 3,059,236 | 10/1962 | Marantette et al. | 318/568 X |
| 3,265,946 | 8/1966 | Johnson et al. | 318/568 X |
| 3,559,021 | 1/1971 | Bingham, Jr. | 318/568 |
| 3,634,662 | 1/1972 | Slawson | 318/568 X |
| 3,739,157 | 6/1973 | Bobrowicz et al. | 318/568 X |

*Primary Examiner*—T. E. Lynch
*Attorney, Agent, or Firm*—George W. Price; John H. Gallagher

[57] ABSTRACT

An automatic work handling and/or performing machine responsive to a recorded program having multiple recording mediums for said program and the capability to transcribe one or more copies of said program from one recording medium onto another. Provision is made for varying the playback speed of said one medium during such transcribing or COPY mode while constraining said machine to execute said programmed work cycle recorded thereon and to respond to said speed variations while maintaining a constant recording speed on said other medium. The resulting transcribed program is modified by compression and expansion of portions of said program data thereon in direct response to the said speed variations to provide a program of the selectively modified work cycle. The transcribed modified program can then be utilized to produce transcribed copies thereof on yet another recording medium, thereby precluding the need to completely reprogram a less than optimum work cycle and providing the capability to optimize a previously programmed work cycle.

23 Claims, 10 Drawing Figures

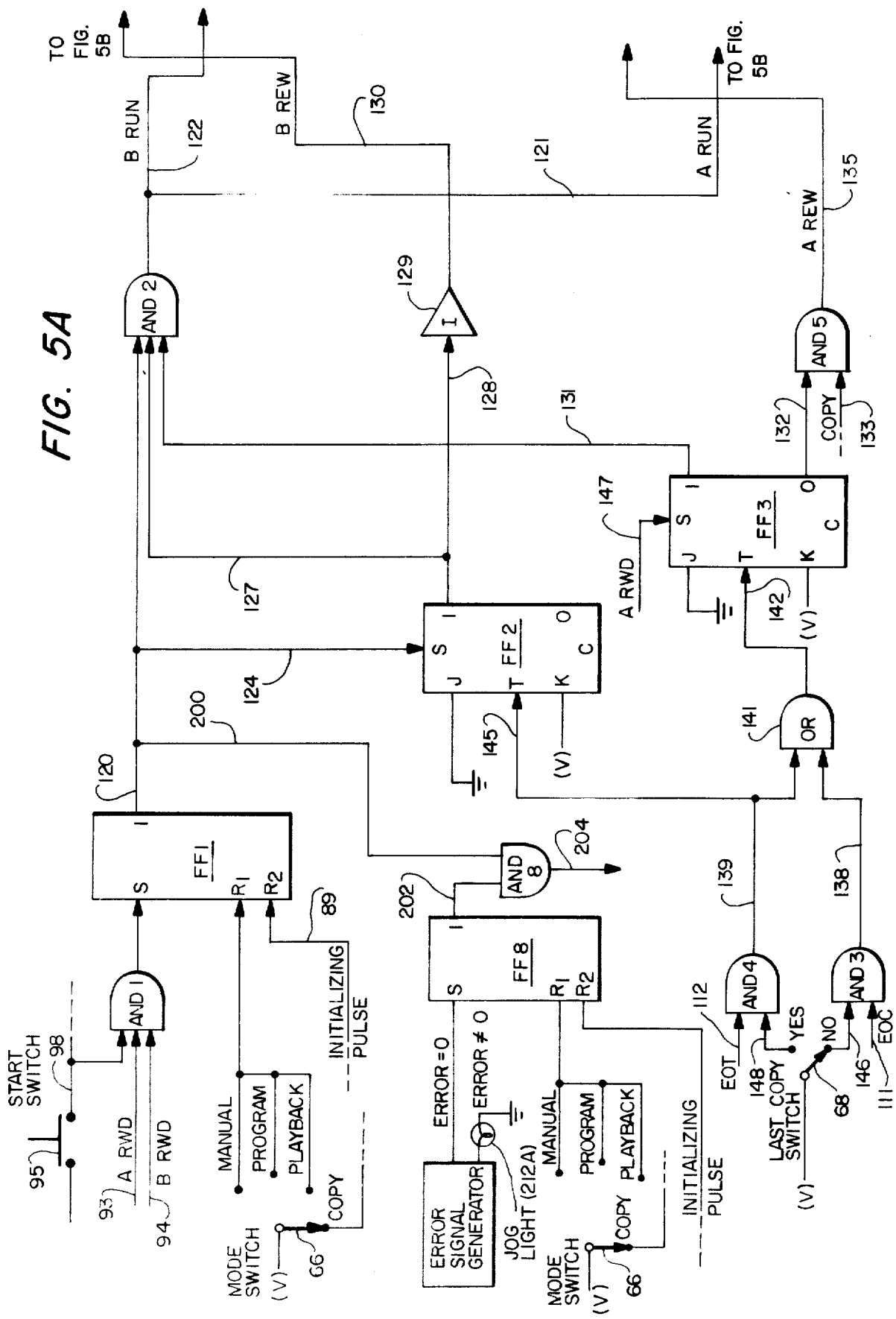

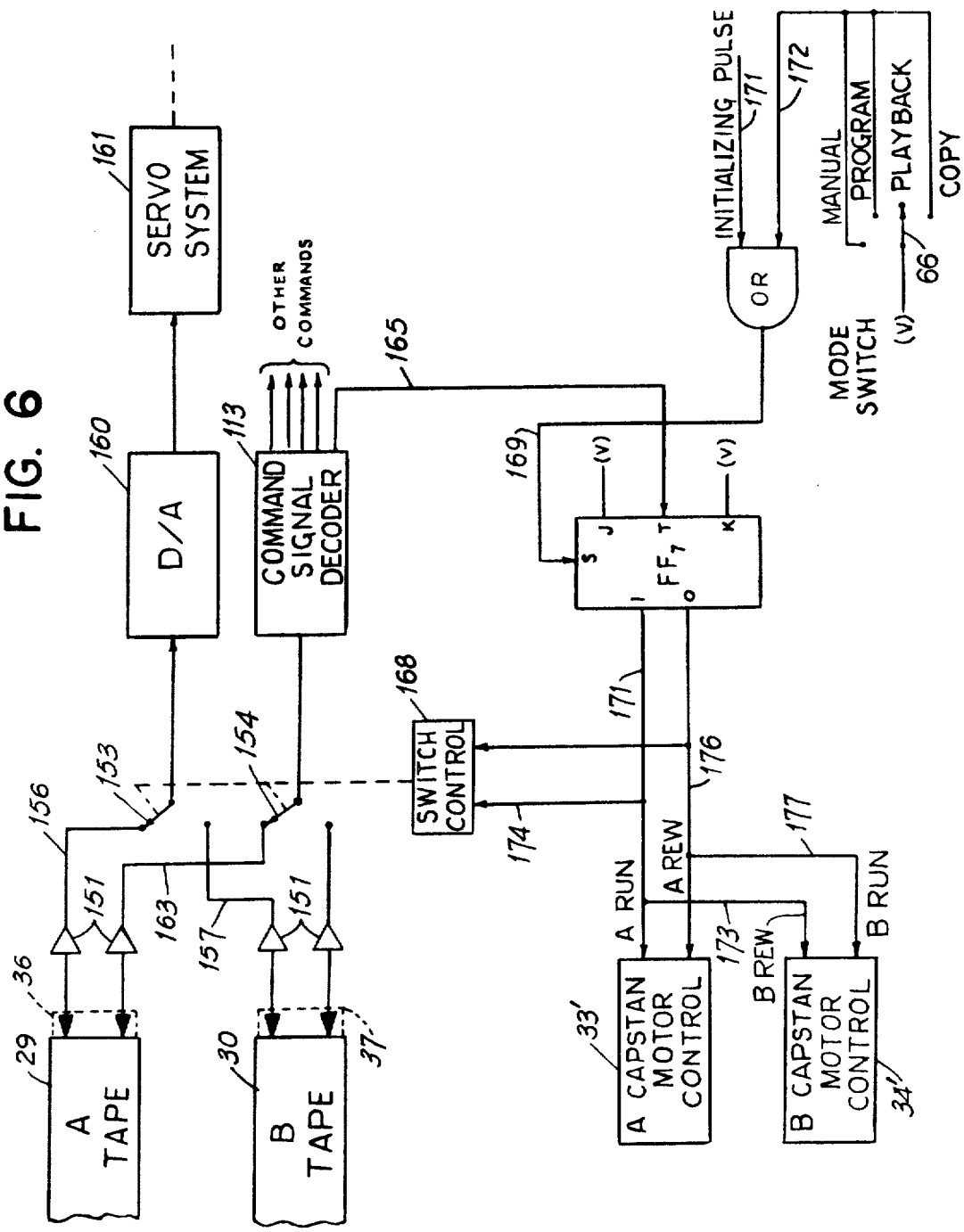

OPTIMIZED EDITING SYSTEM FOR A SERVO CONTROLLED PROGRAM RECORDING SYSTEM

BACKGROUND OF THE INVENTION

Automatic work handling or work performing machines, sometimes called industrial robots, are in use for performing a variety of tasks such as article transfer, repetitive processing, and repetitive assembling, for example. The machines perform their work tasks in a given manner in response to control and command signals emanating from a control system. In the type of machine to be considered herein, control and command signals are recorded on magnetic tape which is played back to provide the appropriate input signals to the control system.

One type of machine which has been developed for handling or operating upon workpieces in a predetermined and preprogrammed manner is generally described in U.S. Pat. Nos. 3,212,649 and 3,265,946. The work handling machine described in the patents has great flexibility and versatility in carrying out either simple or complex movements and operations. The machine operates in three basic modes and has three basic degrees of freedom. It has in addition to the three basic degrees of freedom three additional degrees of freedom whereby many manipulations which could be accomplished by a human hand and arm can be performed by the machine within its range or reach. Once programmed, the machine moves in reponse to information recorded in at least four separate channels on the magnetic tape, three of which are dedicated to the three basic degrees of freedom. The fourth contains information for partial control of the control sysem and operating signals for controlling the machine in the remaining three limited modes.

In the device described in the patents mentioned above, a pair of grippers in the nature of a jaw are opened and closed, rotated and turned in a wrist-like action. The grippers are mounted on a horizontal arm which in turn is mounted on a vertical column through a carriage. The horizontal arm is free to move axially in the carriage and the carriage is free to move vertically on column. In addition to the horizontal column and vertical movements, the column is free to rotate through a substantial angle on its base. Thus the three basic degrees of freedom are the horizontal, vertical and swinging motion of the grippers and supporting arm, while the opening and closing of the grippers and the wrist-like rotation and pivoting of the gripper mount constitute the limited modes of freedom.

These modes permit virtually unlimited movement and special versatility within the range of the machine.

In the type of work handling machine described in the cited patents, a hydraulic system drives the machine through all modes. The movement of the grippers in the three limited modes is on an on-off basis between adjustable stops. In the three basic modes, movements are controlled by hydraulic valves which are electrically actuated from servo-amplifiers. In playing back a recorded program, a signal from a recorded tape is compared with a signal from a position pick-off device such as a resolver or a potentiometer associated with each mode and a difference or error signal utilized to move the machine, altering the output of the position pick-off device until the error attains a null value. When recording signals on a magnetic tape during a programming mode of operation, the hydraulic actuators are not controlled by the respective servo systems, but are directly controlled by amplifiers which are connected to a manual controller which provides programming signals to the actuators. During the programming mode of operation, the output signals of the respective position pick-off devices are recorded on respective tracks of the magnetic tape for subsequent playback. The tape recorded signals, which constitute the control signals during the playback mode of operation at which time the work performing tasks are performed by the machine, may take any of a number of different forms, such as pulse position modulated signals, amplitude modulated signals, or digitally coded signals, for example. In the discussion which follows, it will be assumed that the signals are recorded on magnetic tape in the form of digitally coded signals and that they are converted to analog signals for controlling the hydraulic actuators, and other command functions of the machine. It also will be assumed that the respective servo systems which control the three basic degrees of freedom of the machine operate on analog input signals, one being the converted control signals from the magnetic tape and the other being the analog output signal from a position pick-off device such as a potentiometer which is coupled to monitor the position of respective movable portions of the machine.

In a machine of the type under consideration, one of the attractive features to the user of the machine is that it can be manually preprogrammed directly at the work site to perform its work task. As mentioned previously, this is done by manually directing a control element, called a joy stick, which generates signals to move the machine through its required work task. As the machine moves in response to the manual control, the position pick off signals are recorded on a magnetic tape to generate a recorded sequence of control signals which then constitutes the program for subsequent automatic control of the machine.

To achieve optimum utilization of the machine, it is necessary that the machine be capable of performing repetitive cycles of work functions in continuous succession, with a minimum of lost time between the completion of one complete cycle and the next successive cycle. In U.S. Pat. No. 3,212,649 this is accomplished by employing two magnetic tapes and associated equipment which were simultaneously programmed, or recorded on, in the manner described above, and which are operated in the playback mode so that first one magnetic tape is run in the forward direction to provide control and command signals, and when the end of the single program recorded thereon is reached, the second tape automatically commences running in the forward direction to provide the command and control signals while the first tape is automatically rewound to its starting position. The two tape mechanisms continue to operate alternately back and forth, one running in the forward direction while the other is being rewound.

Quite often the time required for a machine to perform one complete cycle of programmed work tasks is of short duration and much shorter than the total time capacity of a magnetic tape. Therefore, if the tape mechanisms of the type just mentioned continually alternate at a high rate between forward run and rewind, the mechanical mechanisms are subject to considerable degradation, thereby reducing the useful life of the tape mechanisms and the records on the tapes. This may be overcome to some extent by recording many consecutive cycles of control signals on each of the two tapes so that the machine will repeat many cycles of complete work tasks before it becomes necessary to switch to the second tape and rewind the other one.

In U.S. pat. No. 3,298,006 there is disclosed magnetic tape transcribing apparatus for recording onto a copy tape from a master tape having recorded thereon one complete cycle of control and command signals, i.e., one complete program. The one program cycle on the master is repeatedly transcribed onto successive lengths of the copy tape to substantially fill it to its capacity with repetitive cycles of the one program. This apparatus, which was developed by applicant's assignee, was separate and apart from the work performing machine and its control equipment, however, was large, complex, and expensive and for these reasons was somewhat unattractive to a user. Therefore, the machine user had no readily available means for preparing magnetic tapes having repetitive cycles of control programs recorded thereon, and it was difficult for a user of the machine to achieve optimum utilization of his machine. The only alternative to purchasing the transcribing equipment described above was for the user to send his master tape to a commercial transcription facility, or back to the manufacturer of the machine, to have the desired types of copy tapes produced. This involved considerable time during which either the machine was not usable to perform the particular work task or the machine was not usable to the fullest of its capability. This procedure was particularly bothersome when the user found it desirable to make frequent program changes.

Another feature which is lacking in the prior art is the capability of operating the machine during a copy cycle and superimposing operating speed changes in the machine by varying the speed of the program playback tape on which the programmed sequence of the machine is initially recorded, i.e., varying the speed of the master tape to either expand or compress the data being transferred to a constant speed copy tape.

Without this capability, such operations as the application of glass fibers, paint spraying and the like which require, for example, relatively lengthy programs of 10 to 12 minutes duration or longer became cumbersome to modify to achieve optimum machine operation.

For instance, in a paint spraying operation, the machine operator may wish to speed up the program to preclude an excess deposit of paint or slow down the program to insure sufficient deposit of paint on a workpiece.

If this can be effected by selectively varying the speed of the master tape under the direct control of the operator while a copy of the program is being made on a constant speed copy tape, then the copied program has been modified to effect optimum machine operation when the copy tape is utilized to control the machine.

Otherwise, the entire program speed would have to be varied or the entire work cycle reprogrammed by the operator until a satisfactory program is achieved. Both of these prior art alternatives are unsatisfactory, the former lacking selective correction capabilities and the latter requiring undue consumption of time.

SUMMARY OF THE INVENTION

In accordance with the present invention, an automatically controlled work performing machine of the type under consideration is so constructed that the usual program recording and playback apparatus of the machine may be operated in such a manner that all desired record transcription operations may be performed directly on the machine itself by the machine operator, thus requiring a minimum of time and effort to prepare the machine to operate in accordance with its optimum capability. The machine has self programming capabilities of the type previously described, and has two magnetic tape mechanisms, or tape decks, which may be alternately run on playback to provide continuous cycles of control and command signals for actuating the machine.

To prepare two magnetic tapes each having multiple cycles of complete programs recorded thereon, it is necessary to record on one magnetic tape a master program of one complete cycle by the self-programming method described above. Then the master program is successively rerecorded or transcribed a number of times onto a second magnetic tape to fill the recording capacity of that tape. The same procedure may be repeated with another tape to fill its recording capacity, or the first one which had its recording capacity filled may be used as a master and a transcription of the entire recorded content of that tape may be made onto another magnetic tape. By either of these methods two magnetic tapes are readily available for subsequent use in controlling the machine, each tape having a plurality of successively occurring complete programs recorded thereon.

The above operation is achieved with a minimum of effort by the operator and is provided as a selectable copy mode of operation of the basic work performing machine. Much of the usual recording and playback apparatus and circuitry of the machine is utilized to perform the tape transcribing or copying operation so that the added flexibility and utility of the machine is achieved with little additional apparatus and expense.

Further, variable drive speed controls are provided for the master and copy tape decks, the tapes on both decks being selectively interchangeable, such that the master deck speed can be varied while the copy or transcribing deck can be maintained constant to make a new master tape on the copy deck in which instruction data is either compressed or expanded to impose compensating machine speed variations at selected points in the programmed work cycle.

The work performing machine is also provided with the capability of going through its programmed motions during the program copy mode such that the compensation constraints imposed by the operator during a work cycle can be included in the transcribed copy of the program.

Once the optimum program is achieved on a transcribed tape it can then be used as the master to make additional tapes containing one or more programmed work cycles.

The present invention also has the capability of operating with the actuating or control hydraulics locked during the copy mode if only pure transcription of a selected program is desired. When the machine is running during the copy mode, the hydraulics are, of course, unlocked to permit the program to effect a machine work cycle.

BRIEF DESCRIPTION OF THE DRAWINGS

FIGS. 5A and 5B are illustrations of circuit means for making modified copies of a program during a work cycle of the mechanical work performing unit by effecting selectively variable speed control of the operating program tape deck during the said work cycle while concurrently recording the modified program at a constant nominal recording speed on the copy tape deck.

FIG. 6 is a simplified illustration of circuitry for controlling the operation of the mechanical work performing unit in response to successively recorded cycles of signals sensed from two alternately operating magnetic tapes.

DESCRIPTION OF PREFERRED EMBODIMENT

Figure 1:
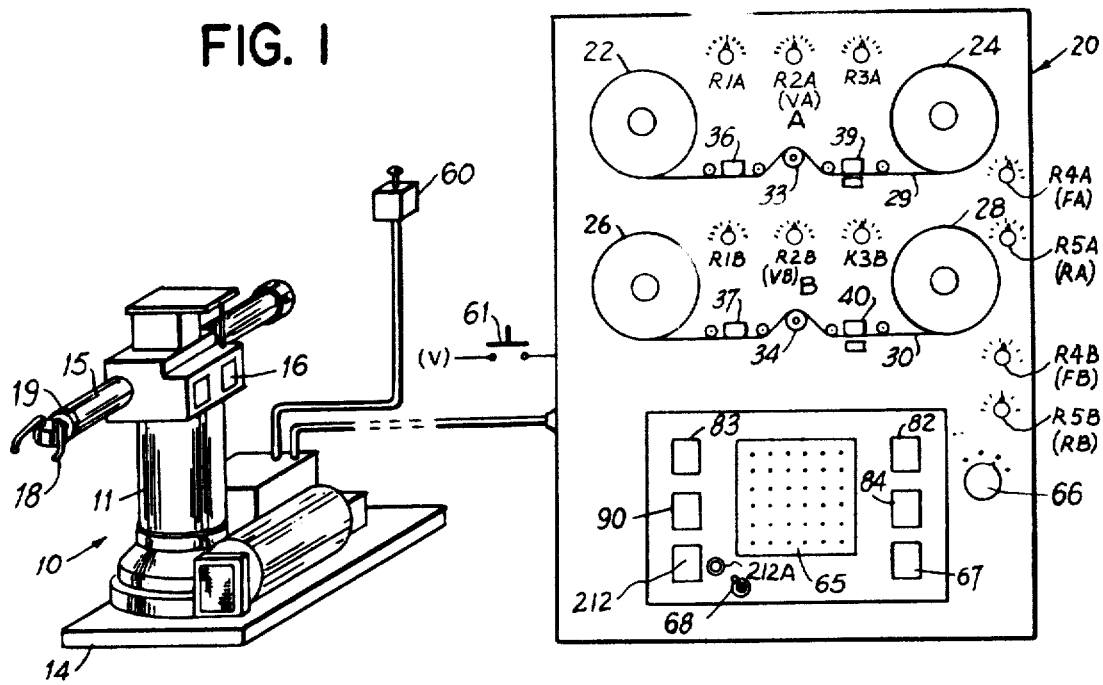
FIG. 1 is a simplified illustration of a mechanical work performing unit and of the console of the control system therefor.

FIG. 1 is a simplified illustration of the work performing aparatus of the present invention wherein the apparatus is comprised of the mechanical unit 10 which includes a vertical column 11 having mounted thereon a carriage 16 which in turn is movable vertically on column 11. Arm 15 is movable horizontally in carriage 16. At the left end of arm 15 is a pair of gripper fingers 18 which may be opened and closed to grasp an article, or work piece. A wrist joint 19 permits grippers 18 to rotate about a horizontal axis through arm 15 and also permits gripper finger 18 to rotate together about a vertical axis. The various movable members of mechanical unit 10 may be actuated by various different mechanisms which respond to electrical control and command signals. For purposes of further discussion it will be assumed that vertical column 11, horizontal arm 15, and carriage 16 are actuated by servo controlled hydraulic actuators. Hydraulic components such as a pump, motor, reservoir, regulator, etc. are mounted on pedestal 14 and are connected to the various actuators in a conventional manner for systems of this type. Gripper fingers 18 and wrist joint 19 operate between positive stops in response to command signals and are not servo controlled.

A console 20 which usually is positioned at some distance from the mechanical work performing apparatus 10 includes two magnetic tape recording and playback mechanisms A and B, both of which may be of known types commonly used in the art. Each of the four reels 22, 24, 26, and 28 is provided with a separate drag motor, the motors for take up reels 24 and 28 being energized so as to rotate in a direction to take up take thereon, and each of the motors for supply reels 22 and 26 being oppositely energized to maintain proper tension on the respective magnetic tapes 29 and 30. The tapes are actually caused to advance or rewind by action of the capstans 33 and 34. The rotation of each capstan is controlled by a respective d.c. reversible motor whose speed is servo controlled and which operates in response to command signals, as will be described in more detail below. The two tape mechanisms include record and sensing heads 36 and 37, and light source and photoelectric sensing units 39 and 40. The leader ends of both tapes 29 and 30 have the magnetizable material removed therefrom to make them translucent to light so that when either of the leader ends is within its respective sensing unit 39 or 40, a signal will be generated to indicate that the tape is in its rewound condition on its supply wheel. In other respects the tape mechanisms are of conventional construction and operation.

Alternatively, a reflective patch can be placed on the tapes 29 and 30 and the sensing devices 39 and 40 can be located, respectively, all on one side of the tapes.

It will be assumed that the magnetic recording tapes 29 and 30 and the recording and sensing heads 36 and 37 will provide at least four tracks of recorded signals, three of the tracks for recording signals that control, respectively, vertical column 11, arm 15, and carriage 16. The fourth track is for recording signals which include command signals for controlling the operation of grippers 18 and wrist joint 19.

Associated with mechanical apparatus 10 is a manual controller, or joy stick, 60 which is a three axis force transducer of the type disclosed in U.S. Pat. No. 3,561,280. Manual controller 60 is used to initially program, or teach, the apparatus to perform the intended work functions.

Controller 60 has three strain gauges to monitor forces applied in three directions to the joy stick by the operator. Each direction of the applied forces corresponds respectively to a desired movement of vertical column 11, arm 15, and carriage 16 to cause the movable members to move as a function of the forces applied to manual controller 60.

The positive pick off devices such as a potentiometer, associated with the servo systems of the movable members of mechanical unit 10 are connected during the program mode of operation to one of the magnetic tape mechanisms A or B on console 20 so that the electrical signals of the position pick off devices are recorded on individual tracks of a magnetic tape. Because it is assumed that signals are to be recorded in digital form, the position pick off signals first are converted from analog to digital form by known analog to digital converter apparatus.

During the program mode of operation it also is required to record command signals to control the operation of grippers 18 and wrist joint 19. Command signals are generated by a means of a preprogrammed command matrix board 65 located on console 20. Matrix board 65 is of a known type having horizontal rows and vertical columns of conductors associated with a plug board. Connection of a horizontal conductor with a vertical conductor is made by means of a conductive pin inserted through a hole in the plug board. A suitable board is obtainable from Co-ord Switch Division of LVC Industries Corporation, Corona, N.Y., part number 63014-5-T. The vertical conductors of the matrix board are connected to individual contacts of a step type of switching means, and the horizontal conductors are connected through a known type of decimal to binary diode matrix converter to the record head of a tape mechanism to record the command signals on a separate track of the magnetic tape. A switch 61 is depressed by the operator to record a desired preprogrammed command signal at the appropriate time that the particular command signal is to be recorded on the magnetic tape. Each time switch 61 is released the step type of switching means selects the next one of the preprogrammed signals for recording.

Console 20 also includes a mode selector switch 66 to condition the apparatus to operate in one of several different operating modes such as manual, program, playback, or copy. Other push type buttons are located on console 20 for initiating various other operations and will be discussed more fully below.

Figure 2:
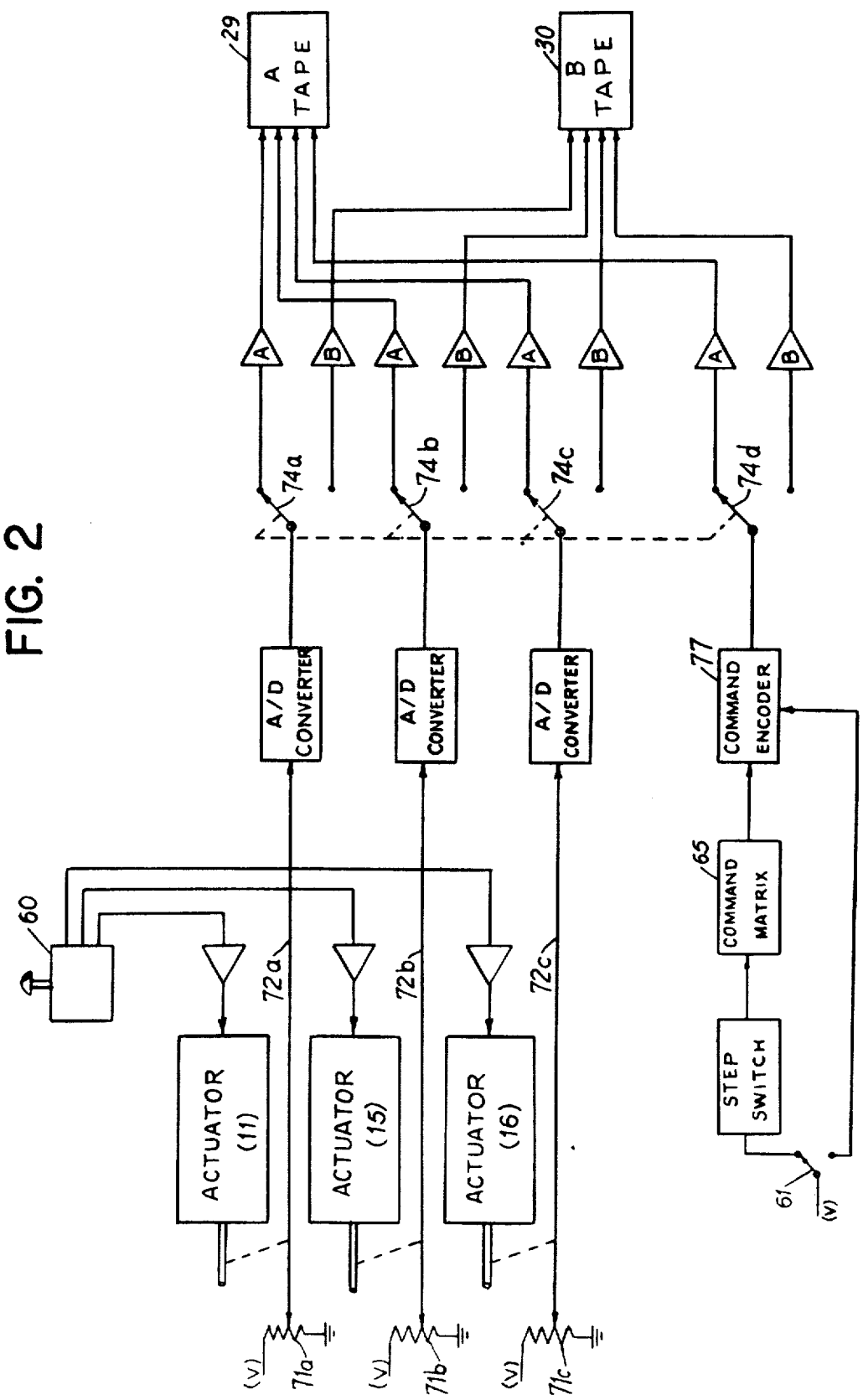

A simplified block diagram of apparatus for producing a recorded cycle of command signals is illustrated in FIGS. 1 and 2. First, mode switch 66 on console 20, FIG. 1 is set in the program mode so that the circuit connections illustrated are established. Manual controller or joy stick 60 has its output leads connected through amplifiers to hydraulic actuators of rotatable column 11, horizontally movable arm 15, and vertically movable carriage 16. The operator actuates manual controller 60 to produce signals which move the hydraulic actuators of mechanical unit 10 through a desired work performing task. Position pick off devices such as potentiometers 71a, 71b, and 71c (FIG. 2) have their movable members mechanically coupled to the mechanical outputs of the actuators so that the electrical analog signals on leads 72A, 72b, and 72c are functions of the positions of the respective movable members 11, 15, and 16 of mechanical unit 10. The analog signals are converted into suitable analog to digital converters 73a, 73b, and 73c and then are coupled through switching means 74a, 74b, and 74c and amplifying means to the recording head of a selected one of the magnetic recording and playback mechanisms. If desired, switched means may be provided for simultaneously recording on both mechanisms. It is assumed that tape A has been selected for recording.

Command matrix 65 has been preprogrammed to establish the interconnections that provide the required command signals and each time switch 61 is depressed a command signal is selected and encoded by command encoder 77. The command signals are coupled through switching means 74d to a separate recording track on tape A.

The system of FIG. 1 continues to record control signals from leads 72a, 72b, and 72c and command signals from encoder 77 until the operator has completed one complete cycle of the work task. At the conclusion of the cycle the operator depresses switch 61 and the next preprogrammed command signal from encoder 77 will be a coded end of cycle signal EOC which is then recorded on tape A. The operator again depresses switch 61 to record the next preprogrammed signal on the command track, this signal being an end of tape signal EOT. Tape A runs in the forward direction during the program mode of operation and the signals are recorded in serial fashion on the respective tracks. During this program mode of operation, tape B remained stationary in its rewound position.

Figure 3:
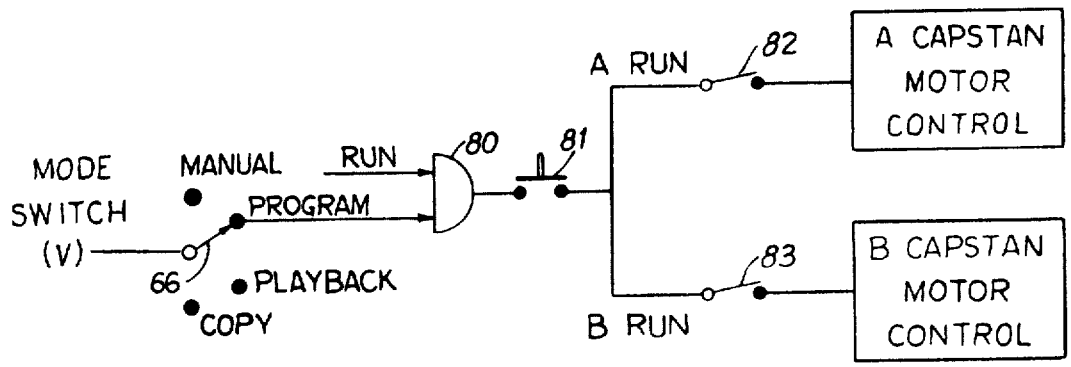
FIGS. 2 and 3 are simplified diagrams illustrating means for recording a cycle of signals to be subsequently used for controlling the operation of the work performing apparatus.

FIG. 3 is a simplified circuit illustrating a control system for operating the tape mechanisms A and B during the program mode. When electrical power is first turned on, the drag motors (not illustrated) associated with the tape reels 22, 24, 26, and 28, FIG. 1, are energized, but neither tape will move because their capstans 33 and 34 are stationary. Mode selector switch 66 is in the program position which provides an enabling signal to enable gate 80 and allow a RUN signal to pass therethrough. A safety switch 81, which is readily accessible to the operator, is depressed by the operator to connect gate 80 to parallel connected switches 82 and 83 labeled A RUN and B RUN. Switches 82 and 83 are located on console 20 and when the operator closes switch 82, the capstan motor of A tape is energized to advance tape A in the forward running direction. At the conclusion of the program mode of operation, switch 82 is opened to stop the motor of capstan 33 of tape A, thus halting the movement of the tape. Tape A then is rewound to its starting position by operation of conventional tape recorder circuitry under command of an A rewind switch 84 on console 20.

Figure 4:
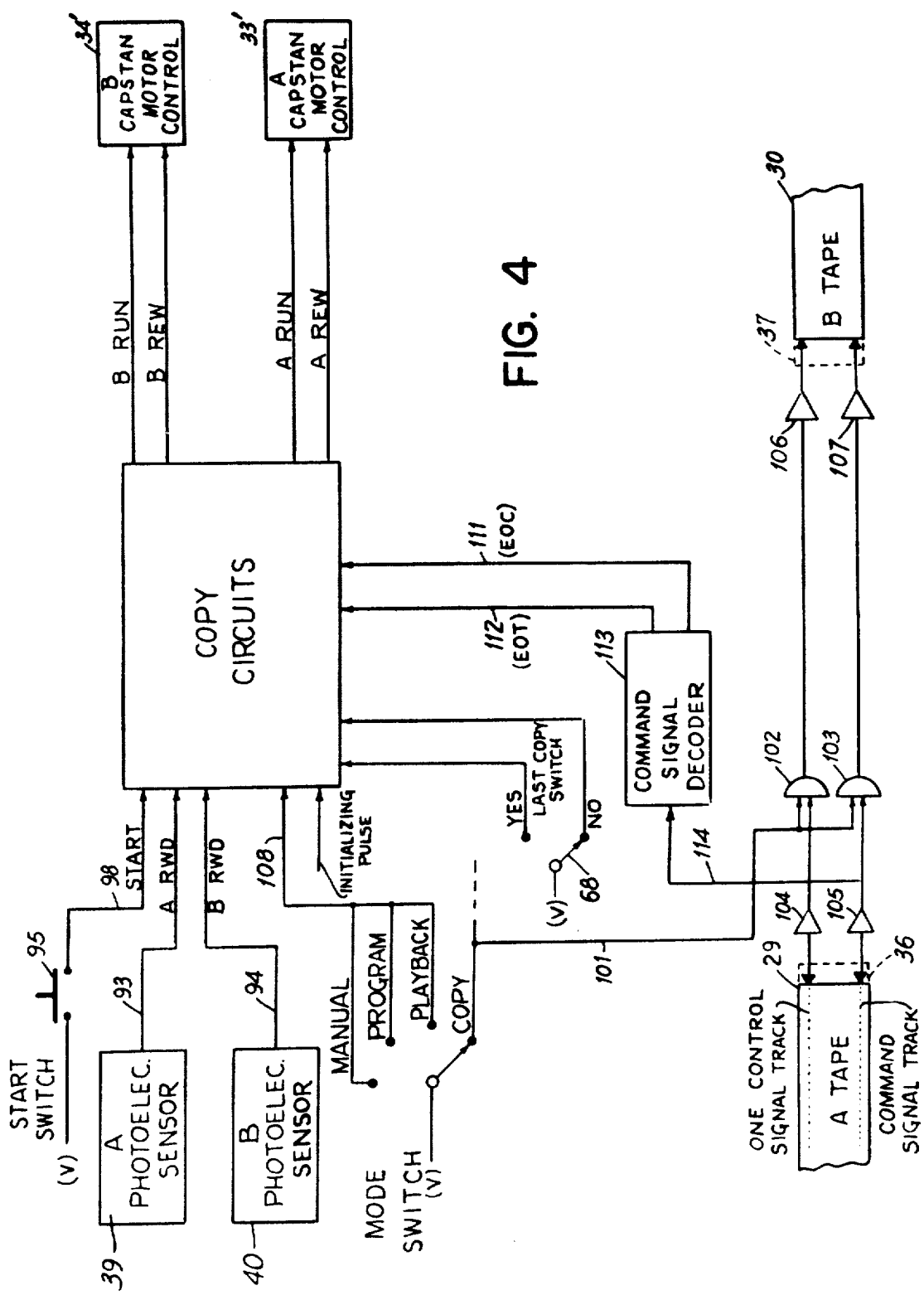
FIGS. 4 and 5 are simplified illustrations of circuit means for copying one cycle of recorded signals from a first magnetic tape to produce a continuous succession of recorded cycles of signal on a second magnetic tape.

The recorded cycle of control and command signals recorded on Tape A now may be used as a master program for copying or transcribing successively occurring complete cycles of signals onto tape B. Means for controlling the two tape mechanisms during this copy mode of operation are illustrated in schematic form in FIGS. 4 and 5. In order to simplify the drawings and description, only the command signal channel and one control signal channel will be illustrated, it being understood that control signals refer to the signals that control the servo controlled movable members 11, 15, and 16 of mechanical unit 10. The command signals may include signals which cause the opening and closing of grippers 18, and the operation of wrist joint 19 as examples. The copy circuits which are illustrated in FIG. 4 in the simplified form of a block, are illustrated in more detail in schematic form in FIG. 5.

The multi wafer mode selector switch 66 on console 20 is set by the operator to establish necessary connections for the copy mode of operation. This establishes the copy mode switch connections shown in FIGS. 4 and 5 as well as connections (not illustrated) for energizing the drag motors associated with tape reels 22, 24, 26, and 28, FIG. 1, so that the motors will be energized as soon as power is turned on. Last copy switch 68 is set in the NO position because the process of transcribing multiple copies of the one recorded cycle of signals onto tape b is just beginning and it is desired to transcribe many cycles on to tape B before the last copy is made.

A power switch 67, FIG. 1, on console 20 is turned on to supply power to the apparatus. The drag motors of tape reels 22, 24, 26, and 28 now are energized but the tapes will not move because the reversible capstan motors are not yet energized. The capstan motors are controlled by relays which open and close in response to various signals, as will be described. When power first is turned on an Initializing pulse automatically is generated by suitable circuitry, not illustrated, and is coupled over lead 89 to the copy circuits to set certain circuits in a desired initial state or condition. This feature is common to many pulse operating systems and is well understood by those skilled in the art.

Since it is assumed that both tapes are in their rewound positions, their translucent leaders are within photoelectric sensors 39 and 40 and the sensors will produce respective a rewound (A RWD) and B rewound (B RWD) signals which are coupled over leads 93 and 94 to the copy circuits.

Start switch 95, a momentary closure switch, also located on console 20 and coupled to the copy circuits through lead 98, FIG. 4, initiates the copy cycle by causing both capstans 33 and 34 to begin to advance the two tapes 29 and 30 in the forward direction.

On one wafer of the multi wafer mode switch 66, the movable contact, when in the copy mode, FIG. 4, supplies an enabling signal on lead 101 which enables gates 102 and 103 so as to couple the read amplifiers 104 and 105 associated with A tape record and sensing head 36 to the write amplifiers 106 and 107 associated with the B tape record and sensing head 37. This connection permits recorded signals on A tape 29 to be sensed and recorded on B tape 30 when the two tapes are moving.

The remaining contacts on the wafer to mode switch 66 are tied together and connected over lead 108 to disable the copy circuits when the apparatus is not in the copy mode of operation.

Other inputs to the copy circuits include the command signal end of cycle (EOC) and end of tape (EOT) on leads 111 and 112. These signals are decoded by command signal decoder 113, a conventional binary to decimal decoder, whose input lead 114, is coupled to the output of read amplifier 105 in the command signal channel.

As will be described immediately below, the copy circuits operate in response to the described input signals to provide run (RUN) and rewind (REW) signals to the capstan motor control means for the two capstans 33 and 34 to automatically cause the apparatus to transcribe onto B tape 30 many copies of the one recorded cycle of signals on A tape 29.

Figure 5:
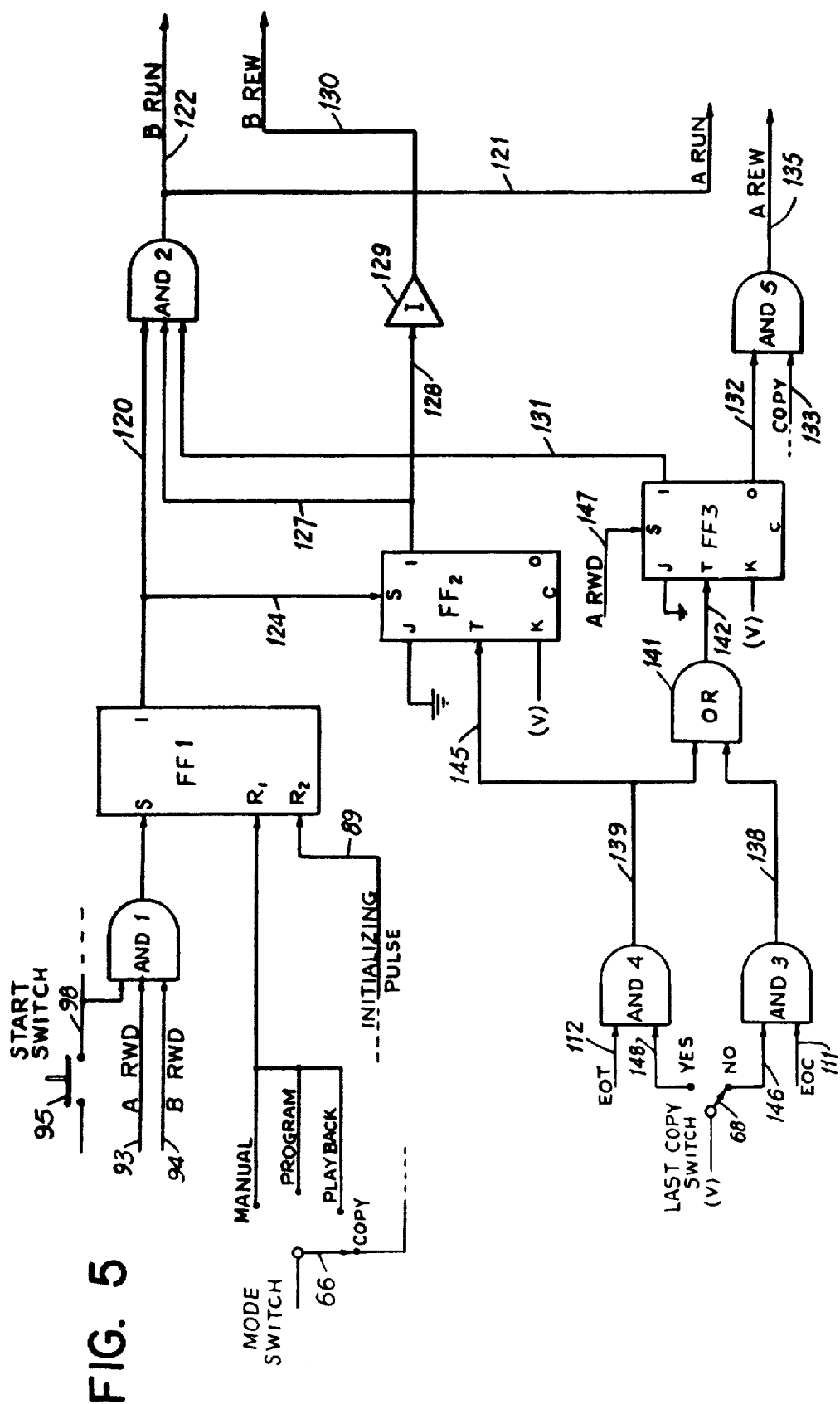

In the discussion of the copy circuits of FIG. 5, it will be assumed that the gating and switching circuitry operates according to positive logic circuit convention. That is, an AND gate passes a signal when all of its inputs are positive, and a flip flop changes from one stable state to another when the appropriate input signal is positive. As is customary, a signal is considered to be positive when it is at the higher of the two possible signal levels, regardless of the absolute value of that higher level. It is well understood that other types of design logic could be utilized in the design and operation of the circuitry of FIG. 5.

First, the initial condition of the circuits of FIG. 5 will be considered, i.e., before start switch 95 is closed. Because start switch 95 is open, AND gate 1 is disabled and its output is low so that it cannot set flip flop FF1. The Initializing pulse which is coupled over lead 89 to flip flop FF 1 when power first is turned on resets FF1 in its zero state so that its 1 output is low. The output of FF1 is coupled by lead 120 to the input of AND gate 2 and disables that gate irrespective of the signals on its other input leads. The output of disabled AND gate 2 is low, so that a RUN and B RUN signals on leads 121 and 122 will be low to indicate the absence of A RUN and B RUN signals. The A and B tapes 29 and 30 thus will remain stationary. The output of FF1 also is coupled over lead 124 to the set input of J-K flip flop FF2, and consequently FF2 remains in its assumed initial condition during which its one output is low. J-K flip flop FF2 is a known type whose J input is grounded and its K input is coupled to a bias source. The C terminal and the zero output terminal of FF2 are not used. As an example, a suitable flip flop is a dual J-K flip flop sold by Texas Instruments under the designation of SN 7476. In the operation of a J-K flip flop as shown in FIG. 5, the leading edge of a pulse signal on its set input S sets it to a condition in which its one output is high.

The trailing edges of pulse signals on the toggle input T cause the flip flop to change state. The zero output of FF3 is coupled over lead 132 to one input of AND gate 5, the other input of which is lead 133 from the copy contact of mode switch 66. The low output of ANd gate 5 represents the absence of an A rewind signal A REW on lead 135.

AND gates 3 and 4 both are disabled because both tapes are in their rewound positions so that neither the end of cycle signal EOC or the end of tape signal EOT are present at the respective inputs to these gates. Because the outputs 138 and 139 of AND gates 3 and 4 are low, no trigger signal will pass OR gate 141 to the input line 142 of FF3, this being the toggle input T which causes FF3 to change states. The output lead 139 of AND gate 4 is coupled to the toggle input T of FF 2 on lead 145 but will have no effect at this time.

Assuming now that the operator actuates start switch 95, FIG. 5, this being a momentary closure switch, lead 98 is energized as are leads 93 and 94 since both tapes are rewound and photoelectric sensors 39 and 40 are sensing the translucent leaders on the tapes. Therefore, AND gate 1 is enabled and its output goes high and sets FF1 so that its one output also goes high. The high signal on lead 124 sets FF 2 so that its one output goes high. Lead 120 now is high as is lead 131 since it has not changed from its previously described condition, so that all three inputs to AND gate 2 are high. AND gate 2 now is opened and its output leads 121 and 122 are high to provide A RUN and B RUN signals to the capstan motor controls 33' and 34', FIG. 4, to cause A and B tapes to run in the forward direction. A RWD and B RWD signals then terminate. The low output of FF 3 on lead 132 closes AND gate 3 and inhibits the A REW signal on lead 135.

With both tapes running in the forward direction the control and command signals are sensed on the A tape and recorded on the B tape by operation of the previously described circuitry illustrated at the bottom of FIG. 4. This copying or transcribing operation continues until the end of the cycle of recorded signals is reached on A tape 29, at which time the end of cycle signal EOC is sensed on the command signal channel of A tape and appears on the input lead 111 of AND gate 3, FIG. 5. The other input lead 146 to AND gate 3 is high since last copy switch 68 is in the NO position so that AND gate 3 is opened and its output lead 138 goes high and, after passing through OR gate 141, appears on the toggle input lead 142 of FF 3 to change that flip flop to its other stable state. The change of state of FF 3 causes its one output on lead 131 to go low, thus disabling AND gate 2 and terminating the A RUN and B RUN signals on leads 121 and 122. This immediately stops both tapes 29 and 30.

When FF 3 changes states, its zero output on lead 132 goes high and enables AND gate 5 since the copy signal on input lead 133 also is high. The output of AND gate 5 on lead 135 goes high to provide an A REW signal that rewinds A tape 29 back to its rewound position where photoelectric sensor 39 senses the translucent leader to provide the A RWD signal which appears on lead 147 at the set input of FF 3 to set it back to its initial condition. In its initial condition the zero output of FF 3 is low so that AND gate 5 is disabled and terminates A REW signal on lead 135.

It will be noted that B tape was not rewound, and the FF 2 has not changed states after having first been set by a high signal on its input lead 124.

The circuitry of FIG. 5 now is in the condition just described for providing the A RUN and B RUN signals to advance both tapes, that is, the one outputs of FF2 and FF3 are both high. The circuitry will continue to operate as described to make successive copies on B tape of the one cycle of signals recorded on A tape.

It will be noted that conventional type recording equipment ordinarily used to control the machine is employed and that it is necessary only that A tape be rewound to prepare the equipment for making successive copies of a recorded cycle of signals.

When the recording capacity of B tape is being approached after a plurality of successive cycles have been recorded thereon, the operator will switch last copy switch 68 to its YES position, indicating that no more copies are to be made on B tape. The apparatus and circuitry will operate as described above until the end of copy EOC signal is sensed and appears on input lead 111 of AND gate 3. But since switch 68 is in the YES position AND gate 3 is disabled and its output will remain low and nothing will happen and both A and B tapes will continue to run in the forward direction until the end of tape signal EOT is sensed and appears at input lead 112 of AND gate 4. Since switch 68 is in the YES position AND gate 4 is enabled to pass the EOT signal to output lead 139 and then on lead 145 to the toggle input T of FF 2 to cause that flip flop to change states. The one output of FF 2 on lead 127 now is low to disable AND gate 2 and thereby terminate A RUN and B RUN signals on leads 121 and 122. Both tapes then stop immediately.

The low output of FF 2 on lead 128 is inverted by inverter 129 to produce a B REW signal on lead 130 to rewind the B tape.

The high output of AND gate 4 on lead 139, EOT signal, passes through OR gate 141 and appears on input lead 142 of FF 3 to toggle that flip flop to cause it to change states, thus causing its zero output on lead 132 to go high and open AND gate 5 whose output lead 135 goes high to provide A REW signal. A tape also then rewinds to its starting position.

The copying operation will not repeat because FF 2 is in a condition in which its one output is low, thus disabling AND gate 2.

If desired, another blank tape may be substituted for B tape and a second complete tape of successive cycles of control signals may be recorded on the new tape so that two full tapes are now available for use in operating the work performing unit 10 of FIG. 1. Alternatively, the B tape having successive cycles recorded thereon could be placed in the A tape position and a blank tape could be placed in the B position. With the last copy switch 68 in the YES position, a copy mode of operation would again be initiated as described above and the entire recorded content of the original B tape would be recorded onto the new tape. The circuitry of FIG. 5 would function as described, always ignoring the EOC signals but terminating the copying operation when the EOT signal was sensed at the end of the original B tape which now is serving as a master tape.

It now is asssumed that both A and B tapes are filled to capacity with successively recorded cycles of signals and that it is desired to operate the apparatus in the playback mode during which signals are sensed from one of the tapes to control the operation of the work performing unit 10. The playback mode is selected on mode switch 66 which disables the copy circuits discussed above and connects the circuitry of the apparatus suitable for playback. FIG. 6 will be used in describing this mode of operation. For simplicity, FIG. 6 illustrates only the command signal channel and one control the signal channel which ultimately controls servo system of one movable member such as arm 15, carriage 16, or column 11 of the mechanical unit 10 of FIG. 1.

The tape sensing means 36 and 37 of A tape and B tape are connected to the two signal channels read amplifiers 151 and the two ganged switches 153 and 154 so that in one position of the switches, command signals sensed from A tape 29 are coupled from lead 156, through switch 153 to digital to analog converter 160 to the servo system 161 of a given movable member of the mechanical unit 10. At the same time control signals sensed from A tape are coupled from lead 163, through switch 154 to command signal decoder 113 which decodes the end of tape signal EOT which appears on output lead 165. In the other position of switches 153 and 154 the control and command signals sensed from B tape are coupled, respectively, to digital to analog converter 160 and command signal decoder 113. The operation of switches 153 and 154 is under control of a switch control means 168, as will be described.

The operation of capstan motors 33 and 34 is under control of a J-K flip flop FF 7, which may be similar to those of FIG. 5, except that FF 7 has both the J and K inputs connected to a bias source. In this arrangement, FF 7 will be set to a first condition by a pulse signal on its set S input, the one output being high in this condition. After FF 7 is set, it will change back and forth, i.e., will toggle between its two states in response to successive pulses applied to its toggle input T. Each time a pulse is applied to set input S, FF 7 will be set in its first condition if it is not already in that condition.

The toggle input to FF 7 will toggle to a different state each time one of the tapes reaches its end. The set input to FF 7 is the output from OR gate 7 on lead 169 whose two inputs are the Initializing pulse on lead 170 which occurs when power is first turned on, as previously described, and the lead 172 which is connected to the contacts other than the playback contacts of mode selector switch 66. a bias voltage to enable OR gate 7 whenever mode switch 66 is in other than the playback mode of operation.

In operation, when power is turned on an Initializing pulse on lead 170 opens OR gate 7 and provides a pulse on lead 169 which sets FF 7 in its first condition during which its one output on lead 171 is high. Lead 171 is connected to A capstan control means 33' to provide an A RUN signal to start A tape moving in the forward direction. The same signal is coupled over lead 173 to B capstan control means 34' and constitutes a B REW signal which causes B tape to rewind if it is not already rewound. Here, as elsewhere, if a tape is already rewound when its capstan control means receives a rewind signal, the rewound signal RWD associated with that tape will override the REW signal to prevent the further movement of that tape.

Lead 171 also is coupled to switch control means 168 over lead 174 to connect switches 153 and 154 to the control and command channels of A tape. Thus, when power first is turned on in the playback mode, A tape always begins running first.

When the end of A tape is reached, command signal decoder 113 decodes the EOT signal which is coupled over lead 165 to toggle FF 7 to its second condition during which its zero output is high and its one output is low. The zero output of FF 7 is coupled over leads 176 and 177 to B capstan motor control to provide a B RUN signal thereto. The same signal is coupled to A capstan motor control and operates thereon as an A REW signal which causes A tape to rewind to its starting position. Lead 176 also is coupled to switch control means 168 to cause switches 153 and 154 to connect with the control and command channels of B tape.

When the end of B tape is reached, another EOT signal will appear on lead 165 and FF 7 will be toggled back to its first condition wherein all operation conditions again are established with respect to A tape.

The circuitry of FIG. 6 will continue to operate as described so long as mode switch 66 is in the playback position and so long as power is on. Thus the control of the movable members of the mechanical unit 10 alternately changes from A tape to B tape, each tape providing a succession of cycles of signals.

In view of the above discussion it is seen that the usefulness and flexibility of the work performing apparatus has been significantly increased by providing a control system which permits an operator to record successive programs, or cycles of signals, with apparatus which is part of the usual operating apparatus. The operator thus makes his own programmed tapes, or change portions of the recorded programs and no time is lost and little expense is incurred, as would occur if the apparatus did not have that capability and the service had to be performed by a commercial transcription service, for example.

It is to be understood that in some instances it may be desirable that the master copy of one cycle of recorded signals be prepared by some means other than by manually operating the apparatus, as by joy stick 60, FIG. 1, to perform one cycle of the desired work function. For example, the one cycle master tape may be prepared by computer means not associated with the apparatus described herein. In this instance, the above-described apparatus described would be utilized by the operator to prepare two copy tapes each having successive cycles of signals thereon to fill the recording capacity of each tape.

VARIABLE SPEED COPY MODE

Figure 5B:
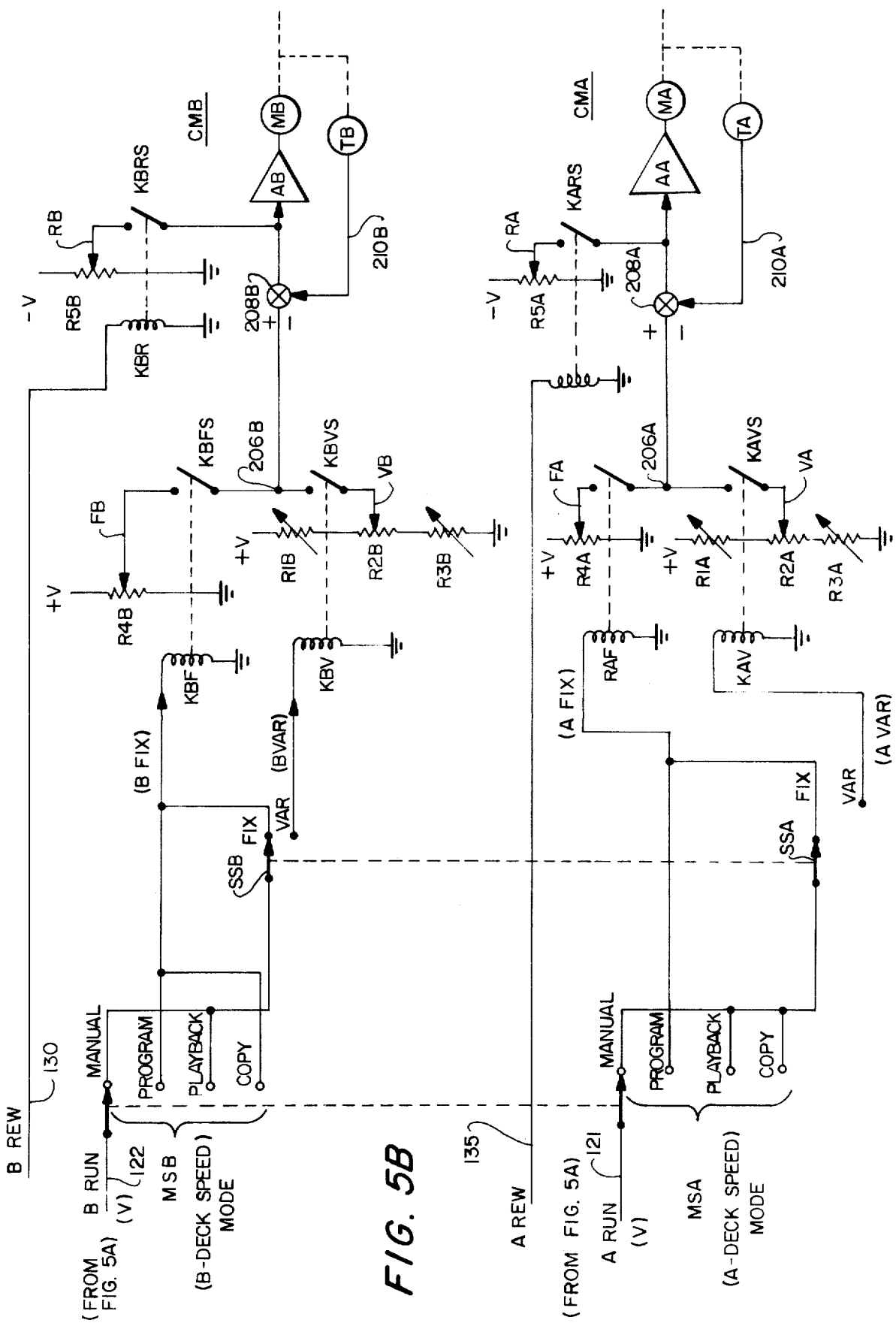

Referring to FIGS. 5A, and 5B, the variable speed embodiment of the invention will now be described, wherein like numerals to the other Figures designate like elements.

The first flip-flop FF1 has its output coupled through a lead 200 to one input of an AND gate designated and hereinafter referred to as AND8.

The other input of the gate AND8 consists of a lead 202 which is connected from the output pin (1) of an eighth flip-flop FF8 of the same type as the first flip-flop FF1 and having identical connections at its first and second reset inputs R1 and R2 as the said flip-flop FF1.

The set input(s) of the flip-flop FF8 is connected to an ERROR=0 signal source which when true, will cause the output pin (1) of the flip-flop FF8 to go high,
unlocking the hydraulics of the machine 10 through output 204 of gate AND8 if concurrently, a high signal appears at the output pin (1) of the flip-flop FF1.

The UNLOCK HYDRAULICS signal on the output 204 of Gate AND8 serves in a conventional manner to enable the hydraulics system through a suitable control system in like manner to the hydraulics control systems in U.S. Pat. Nos. 3,212,649 and 3,265,946 previously referred to herein.

The ERROR=0 signal is also derived in a conventional manner such that the machine can be jogged manually into a current command position demanded by the program (command signals recorded on the program tape) and the corresponding coded command currently present in the D/A code converter 160 of the machine 10 (see FIG. 6). Such error detection means and error signal generators are disclosed in the prior patents previously referred to herein.

As shown in FIG. 5B, the A RUN and B RUN leads 121 and 122 are connected, respectively, through the position selecting contacts of A and B tape deck speed mode control switches MSA and MSB, respectively, ganged to the mode switch 66, each of which include positions corresponding to the other wafers of the mode switch 66, namely, MANUAL, PROGRAM, PLAY BACK and COPY mode contacts.

The mode position contacts of the speed mode control switches MSA and MSB are connected through second corresponding two-position speed mode switches SSA and SSB, respectively having fixed speed FIX and variable speed VAR positions for correlating a given operating mode with a particular speed mode for a given tape deck, either selectively or pre-wired constraint.

In regard to the A-deck, for example, the PROGRAM mode position contact of the first speed mode switch MSA is prewired to the FIX (fixed speed) position of the second speed mode switch SSa. Meanwhile, for the B-deck, both the PROGRAM and COPY mode position contacts of the first speed mode switch MSB are pre-wired to the FIX (fixed speed) position of the second speed mode switch SSB.

Therefore, the following table of possible speed modes in each possible operating mode results.

| Operating Mode | Tape Deck A | Tape Deck B |
| --- | --- | --- |
| MANUAL | FIX/VAR | FIX/VAR |
| PROGRAM | FIX | FIX |
| PLAYBACK | FIX/VAR | FIX/VAR |
| COPY | FIX/VAR | FIX |

In order to preclude any variance from the foregoing condition table, the first speed mode switches MSA and MSB are ganged together as are the second speed mode switches SSA and SSB, such that, except for the variances established by the pre-wired constraints, the fixed and variable speed modes of the A and B tape decks coincide.

The fixed speed outputs A FIX and B FIX of the speed mode switch means MSA-SSA and MSB-SSB, respectively, drive fixed speed selection relays KAF and KBF; while the variable speed outputs A VAR and B VAR of the said mode switch means MSA-SSA and MSB-SSB, respectively, drive variable speed selection relays KAV and KBV; all of the said selection relays acting to control the capstan motor drive control circuits CMA and CMB which correspond, respectively, to the A and B tape decks.

The A and B tape deck rewind outputs AREW and BREW, respectively, via leads 135 and 130, control rewind selection relays KAR and KBR in the capstan motor drive control circuits CMA and CMB.

The A deck variable speed control comprises first, second and third resistors R1A, R2A and R3A, respectively, all connected in series from a positive voltage source to ground, the first and third such resistors being variable and the second resistor having a variable center tap VA connected through the normally open contacts KAVS of selector relay KAV to a common input junction 206A in the capstan control circuit CMA.

The common input junction 206A is connected to a summing junction 208A which in turn is connected at the input of an amplifier AA.

The output of the amplifier AA drives the A-deck capstan motor designated MA which in turn drives a tachometer TA, the latter providing a feedback signal to the summing junction 208A through a lead 210A as is known in the art.

The A deck fixed speed control comprises a resistor R4A connected from a source of positive voltage to ground and having a variable center tap FA, the latter being connected through the normally open contacts KAFS of the fixed speed selector relay KAF to the common input junction 206A of the capstan motor drive control circuit CMA.

The rewind speed control for the capstan control circuit CMA is similar to the fixed speed control for the latter and comprises a resistor R5A connected from a source of negative voltage to ground with a variable center tap RA connected through the normally open contacts KARS of the rewind selection relay KAR, directly to the input of the amplifier AA in the capstan control circuit CMA, to apply the negative or rewind voltage signal on the proper side of the summing junction 208A.

The B deck variable speed control comprises first, second and third resistors R1B, R2B, and R3B, respectively, all connected in series from a positive voltage source to ground the first and third such resistors being variable and the second resistor having a variable center tap VB connected through the normally open contacts KBVS of selector relay KBV to a common input junction 206B in the capstan control circuit CMB.

The common input junction 206B is connected to a summing junction 208B which in turn is connected at the input of an amplifier BB.

The output of the amplifier BB drives the B-deck capstan motor designated MB which in turn drives a tachometer TB, the latter providing a feedback signal to the summing junction 208B through a lead 210B as is known in the art.

The B deck fixed speed control comprises a resistor R4B connected from a source of positive voltage to ground and having a variable center tap FB, the latter being connected through the normally open contacts KBFS of the fixed speed selector relay KBF to the common input junction 206B of the capstan motor drive control circuit CMB.

The rewind speed control for the capstan control circuit CMB is similar to the fixed speed control for the latter and comprises a resistor R5B connected from a source of negative voltage to ground with a varable center tap RB connected through the normally open contacts BKRS of the rewind selection relay KBR, directly to the input of the amplifier BB in the capstan control circuit CMB, to apply the negative or rewind voltage signal on the proper side of the summing junction 208B.

Referring to FIG. 1, the control panel 20 of the machine 10 is provided with a JOG BUTTON 212 with the associated JOG LIGHT 212A which is illuminated as long as the ERROR SIGNAL from the ERROR SIGNAL GENERATOR is other than zero.

Figure 7:
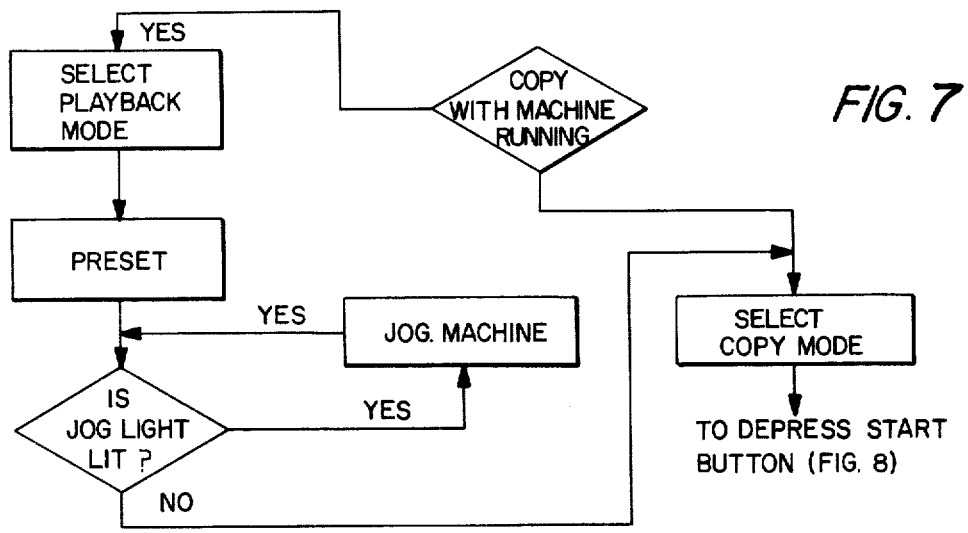
FIGS. 7 and 8 are program flow diagrams of the normal and variable speed copy modes of the present invention.

The JOG BUTTON 212 and JOG LIGHT 212A are utilized as shown in the program flow diagram of FIG. 7 to bring the machine 10 to a current command position, i.e., a position corresponding to any given position command data from the tape deck A which is currently present in the D/A converter 160 (FIG. 6). It is at this current command position of the machine 10 that the ERROR = 0 condition is achieved, thus satisfying one of the necessary conditions to unlock the hydraulics of the machine 10 to permit it to run and perform work during the variable speed COPY mode of the invention.

Figure 8:
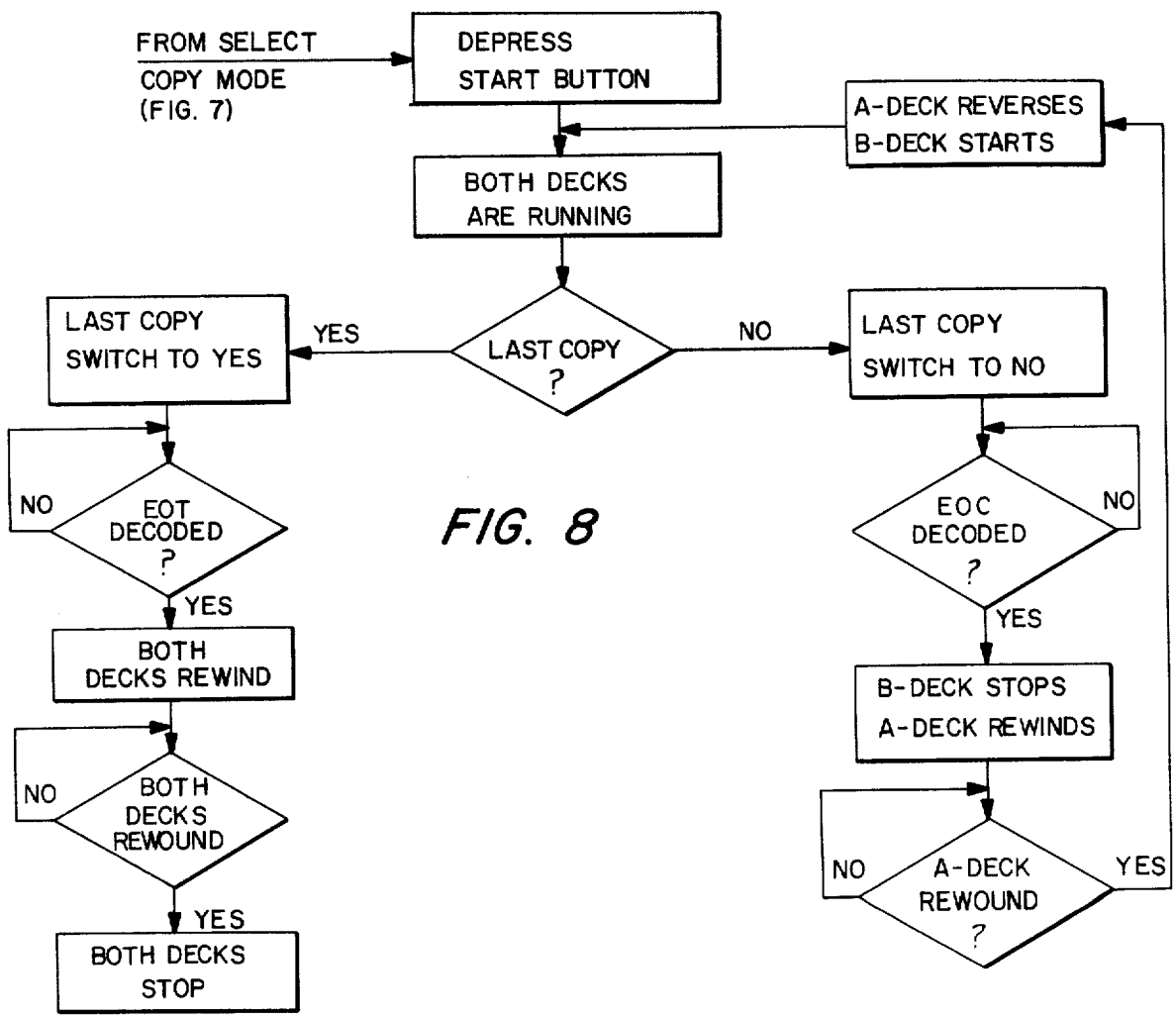

Once started, the COPY mode of the machine 10 is effected as generally shown in the program flow sheet of FIG. 8.

VARIABLE SPEED COPY MODE WITH MACHINE OPERATING

In this mode of operation, the machine 10 must be capable of going through the motions of its work cycle while the program for that cycle is being transcribed from the A tape deck to the B tape deck. This requires that the machine hydraulics (servo system 161) be operative, i.e., in an UNLOCK HYDRAULICS condition, during the variable speed COPY mode.

As previously described, once the machine has been jogged to a given current command position, the ERROR = 0 condition is achieved at the SET input S of the flip flop FF 8 (refer now to FIG. 5A) causing a high signal on the output pin 1 thereof which is applied through lead 202 to one input of the gate AND 8.

With the mode switch 66 set in the COPY position (all wafers of the said mode switch), the A and B tape decks rewound and the start switch 95 closed, the gate AND 1 sets the flip flop FF 1, driving leads 120 and 200 high from the output terminal pin of FF 1, enabling the gate AND 8 to thereby effect the UNLOCK HYDRAULICS condition in the COPY mode position of mode switch 66.

The operation of the system in FIG. 5A is otherwise identical to that previously described for FIG. 5.

The LAST COPY switch 68 is placed in the NO position at this time if more than one copy is desired on tape deck B.

If a program on tape deck A has been found to properly effect a desired work cycle in the machine 10, the normal COPY mode is utilized.

If certain areas of the program need adjustment, then the variable speed mode is utilized to optimize the programmed work cycle.

Referring now to FIG. 5B, the COPY position of the mode switch wafer MSB constrains the tape deck B to operate in the fixed speed mode by constraining a prewired BFIX condition of the tape deck B, energizing the fixed speed relay KBF, closing contacts KBFS and applying operating voltage to the summing junction 208B through the resistor R4B, variable tap FB and common junction 206B. This causes the amplifier BB to drive the capstan motor or motors MB at a fixed recording speed which is preset by the position of the variable tap FB on the resistor R4B.

On the other hand, the COPY position of the mode switch wafer MSA subjects the tape deck A to control by the speed selector switch SSA, which, if the variable speed COPY mode is desired, is thrown to its VAR position, setting the speed mode of tape deck A to AVAR. This energizes the variable speed relay KAV, closing contacts KAVS and connecting operating voltage to the summing junction 208A the capstan motor circuit CMA through the variable resistors R1A and R3A, center tap VA of the speed control resistor R2A and the common circuit junction 206A.

The speed variation in the capstan drive motor or motors MA is effected by selectively positioning the variable center tap VA on the speed contract resistor R2A. The upper and lower limits of the range of speed variation are set by selective adjustment of the first and second variable resistors R1A and R3A, respectively.

Similar speed variation can be made in other operating modes on the tape deck B by the speed range resistors R1B and R3B, the speed control resistor R2B and its variable tap VB in a like manner to the tape deck A.

With the machine 10 in the HOME position and the tape decks A and B set for a nominal constant recording speed, for example, of 7.5 inches per second by the setting of variable taps VA and FB, respectively, the operator attending the machine can permit the work cycle to progress as constrained by the program on tape deck A while that program data is concurrently being transcribed on tape deck B.

In this variable speed copy mode, the operator observes the work cycle and by adjusting the variable tap VA on the resistor R2A (FIGS. 1 and 5B) the program data on tape deck A is presented to both the machine 10 and the tape deck B at varying rates to thereby optimize the performance of the machine 10 in the programmed work cycle.

Since the original program on tape deck A was recorded at a constant nominal speed, the variation in playback speed via the variable tap VA causes data to be compressed or expanded on the tape deck B due to its constant nominal speed setting.

These compressions and expansions of data will then be imparted to the machine 10 as speed changes when the program recorded on tape deck B is used as the operating program for the machine 10, thereby, to duplicate the variations in the work cycle achieved by varying the playback speed of the tape deck A.

If the recording on tape deck B is now placed on tape deck A and a fresh tape is inserted on tape deck B, a normal COPY mode can be instituted with the machine 10 deactivated (hydraulics locked) and a multiple transcription of the modified program made on the fresh tape.

The latter (fresh) tape can then be used as a master tape to produce additional multiple transcriptions in the manner previously described.

It should be understood that the various circuit components and other elements shown herein, while representative of a preferred embodiment of the invention, can be selectively interchanged with equivalent components and elements without departing from the spirit and scope of the present invention. For example, the relays KAF, KAV, KAR, KBF, KBV, KBR and their associated contacts in FIG. 5B can readily be replaced with solid state switching means.

We claim:

1. Work performing apparatus having a control system for providing signals that control the movements of a work performing unit wherein said control system includes first and second recording mechanisms each having means for recording and for sensing signals on a respective movable recording medium associated therewith and having means for coupling sensed signals from said first or second mechanisms to said work performing unit thereby to control its movements in response to the sensed signals, and means for operating the recording mechanisms of the apparatus to sense a recorded cycle of signals on a recording medium associated with the first recording mechanism and to record the sensed signals onto the recording medium associated with the second recording mechanism; the improvement in said control system comprising:

mode selector means constraining said work performing unit to execute movements corresponding to a playback of said recorded cycle of signals on said first recording medium while transcribing said signals on said second recording medium; and control means for selectively modulating the playback of said recorded cycle of signals on said first recording medium to selectively optimize the movements of said work performing unit and correspondingly modulate said transcribed cycle of signals on said second recording medium to provide a recorded program of said optimized movements of said work performing unit on said second recording medium.

2. The invention defined in claim 1, wherein said control means comprises speed determining means for selectively modulating the playback speed of said first recording medium and maintaining a constant recording speed on said second recording medium during said modulated playback of said first medium.

3. The invention defined in claim 2, wherein said speed determining means further includes speed range means for selectively varying the upper and lower modulated limits of said playback speed of said first recording medium.

4. The invention defined in claim 1, wherein said control means comprises fixed and variable speed determining means for selectively fixing or varying the recording and playback speeds of each of said recording mediums; and speed mode switch means interacting with said mode selector means for selectively enabling each said recording medium to operate in said fixed and variable speed modes in correlation with the operating modes of said work performing apparatus; and wherein said mode selector means further includes mode switch means for selectively constraining said apparatus in said operating modes.

5. The invention defined in claim 4, wherein said control means comprises speed determining means for selectively modulating the playback speed of said first recording medium and maintaining a constant recording speed on said second recording medium during said modulated playback of said first medium.

6. The invention defined in claim 5, wherein said speed determining means further includes speed range means for selectively varying the upper and lower modulated limits of said playback speed of said first recording medium.

7. The invention defined in claim 4, wherein said operating modes comprise manual, program, playback and copy modes; and wherein, in said program mode, said speed mode switch means disables said variable speed mode in said first and second recording mediums and in said copy mode, said speed mode switch means disables said variable speed mode in said second recording medium.

8. The invention defined in claim 7, wherein said control means comprises speed determining means for selectively modulating the playback speed of said first recording medium and maintaining a constant recording speed on said second recording medium during said modulated playback of said first medium.

9. The invention defined in claim 8, wherein said speed determining means further includes speed range means for selectively varying the upper and lower modulated limits of said playback speed of said first recording medium.

10. The invention defined in claim 1, wherein said mode selector means further includes error signal means indicating discrepancies between said recorded signals on said first recording medium and the response of said work performing work thereto;

recording medium condition sensing means; and logic means responsive to said condition sensing means and said error detecting means for selectively enabling said work performing unit to follow said recorded signals on said first recording medium during transcription thereof on said second recording medium.

11. The invention defined in claim 10, wherein said control means comprises speed determining means for selectively modulating the playback speed of said first recording medium and maintaining a constant recording speed on said second recording medium during said modulated playback of said first medium.

12. The invention defined in claim 11, wherein said speed determining means further includes speed range means for selectively varying the upper and lower modulated limits of said playback speed of said first recording medium.

13. The invention defined in claim 10, wherein said control means comprises fixed and variable speed determining means for selectively fixing or varying the recording and playback speeds of each of said recording mediums; and speed mode switch means interacting with said mode selector means for selectively enabling each said recording medium to operate in said fixed and variable speed modes in correlation with the operating modes of said work performing apparatus; and wherein said mode selector means further includes mode switch means selectively constraining said apparatus in said operating modes.

14. The invention defined in claim 13, wherein said control means comprises speed determining means for selectively modulating the playback speed of said first recording medium and maintaining a constant recording speed on said second recording medium during said modulated playbaack of said first medium.

15. The invention defined in claim 14, wherein said speed determining means further includes speed range means for selectively varying the upper and lower modulated limits of said playback speed of said first recording medium.

16. The invention defined in claim 13, wherein said operating modes comprise manual, program, playback and copy modes; and wherein, in said program modes, said speed mode switch means disables said variable speed mode in said first and second recording mediums and in said copy mode, said speed mode switch means disables said variable speed mode in said second recording medium.

17. The invention defined in claim 16, wherein said control means comprises speed determining means for selectively modulating the playback speed of said first recording medium and maintaining a constant recording speed on said second recording medium during said modulated playback of said first medium.

18. The invention defined in claia 17, wherein said speed determining means further includes speed range means for selectively varying the upper and lower modulated limits of said playback speed of said first recording medium.

19. The method of operating a work performing apparatus having a control system for providing signals that control the movements of a work performing unit, wherein the control system includes first and second recording mechanisms each having means for recording and for sensing signals on a movable recording medium associated therewith, and having means for coupling sensed signals from said first or second mechanisms to the work performing unit thereby to control its movements in response to the sensed signals, said method of operating the apparatus comprising:

placing a recording medium having one complete cycle of desired recorded signals thereon in operative association with a first one of the recording mechanisms of the control system, said cycle of recorded signals concluding with an end of cycle signal and followed by an end of medium signal;

placing an unrecorded recording medium in operative association with the second one of the recording mediums;

establishing electrical connections between the two recording mechanisms;

advancing both of said recording mediums from respective starting positions;

constraining said work performing unit to execute movements corresponding to said recorded signals on said first recording medium;

maintaining a constant selected recording speed of said second recording medium;

modulating the playback speed of said first recording medium and thereby modulating the execution of movements by said work performing unit and correspondingly modulating the rate of playback of recorded signals on said first recording medium;

transcribing said recorded cycle of signals from the advancing first medium, including said modulated rate of playback thereof, to the advancing second medium;

sensing the recorded end of cycle signal on said first medium and transcribing same and said second medium while continuing the advance of both mediums;

sensing the end of medium signal on said first medium, transcribing same on said second medium;

returing both said mediums to a starting position in response to said end of medium signal;

advancing both said mediums from said starting position while transcribing said modulated cycle of signals from said advancing second medium on said advancing first medium to replace the cycle of signals initially recorded on said first medium;

sensing the recorded end of cycle signal on said second medium and stopping both mediums in response thereto;

returning said second medium to its starting position in response to the sensed end of cycle signal and producing a starting position signal while maintaining the first medium at its stopped position;

advancing said second medium from its starting position and said first medium from its stopped position in response to said starting position signal;

transcribing the recorded cycle of signals from the advancing second medium to the advancing first medium;

sensing the recorded end of cycle signal on said second medium but continuing the advance of both mediums;

sensing and transcribing the end of medium signal from the second medium to the first medium and stopping both mediums in response to the sensed end of medium signal; and returning both mediums to their starting positions and maintaining them stopped thereat in response to the end of medium signal sensed on the second medium.

20. The method claimed in claim 19 and further including:

establishing electrical connections between the recording mechanism of the control system having the second recorded medium operatively associated therewith and said work performing unit, advancing said second medium, sensing recorded signals on the second medium, controlling the operation of said work performing unit in response to sensed signals from the second medium to cause the unit to perform successive work cycles in response to successively sensed cycles of signals on the second medium.

21. The method of operating a work performing apparatus having a control system for providing signals that control the movements of a work performing unit, wherein the control system includes first and second recording mechanisms each having means for recording and for sensing signals on a movable recording medium associated therewith, and having means for coupling sensed signals from said first or second mechanisms to the work performing unit thereby to control its movements in response to the sensed signals, said method of operating the apparatus comprising:

moving the work performing unit through one desired work cycle under control of an operator, producing a cycle of electrical signals in response to and corresponding to the movement of said unit through said cycle, advancing from a starting position a first recording medium associated with the first recording mechanism of the control systems, recording said cycle of electrical signals on the advancing first recording medium, successively recording an end of cycle signal and an end of medium signal on said first recording medium subsequently to recording said recorded cycle of signals, returning said first recording medium to its starting position and producing a first starting position signal when the starting position is reached, advancing said first recording medium from its starting position and advancing a second recording medium associated with the second recording mechanism of the control system from its starting position, constraining said work performing unit to execute movements corresponding to said recorded signals on said first recording medium;

maintaining a constant selected speed of said second recording medium;

modulating the playback speed of said first recording medium and thereby modulating the execution of movements by said work performing unit and correspondingly modulating the rate of playback of recorded signals on said first recording medium;

transcribing said recorded cycle of signals from the advancing first medium, including said modulated rate of playback thereof, to the advancing second medium;

sensing the recorded end of cycle signal on said first medium and transcribing same on said second medium while continuing the advance of both mediums;

sensing the end of medium signal on said first medium, transcribing same on said second medium;

returning both said mediums to a starting position in response to said end of medium signal;

advancing both said mediums from said starting position while transcribing said modulated cycle of signals from said advancing second medium on said advancing first medium to replace the cycle of signals initially recorded on said first medium;

sensing the recorded end of cycle signal on said second medium and stopping both mediums in response thereto, returning said second medium to its starting position in response to the sensed end of cycle signal and producing another starting position signal while maintaining the first medium at its stopped position, advancing both of said mediums in response to said another starting position signal, transcribing the recorded cycle of signals and the end of cycle signal from the advancing second medium to the advancing first medium, sensing the recorded end of cycle signal on said second medium but continuing the advance of both mediums, sensing and transcribing to the first medium the recorded end of medium signal on said second medium and stopping both mediums in response thereto, returning both mediums to their starting positions and terminating the transcription in response to said end of medium signal, preparing a third recording medium to have successively recorded cycles of signals, end of cycle signals and an end of medium signal thereon substantially identical to said first medium, placing said first and third mediums in operative association with said first and second recording mechanisms in the control system, advancing one of said first or third mediums and sensing the entire content of recorded signals thereon while maintaining the other one of the first or third mediums stopped, controlling the movement of the work performing unit with sensed signals from the advancing one of the first or third mediums, sensing the end of tape signal from the advancing one medium and in response thereto returning the advancing one of the first or third mediums to its starting position and advancing the other one of said first or third mediums, sensing recorded signals on the advancing other medium, and controlling the movement of the work performing unit with sensed signals from said other medium.

22. Work performing apparatus having a control system for providing signals that control the movements of a work performing unit wherein said control system includes first and second recording mechanisms each having means for recording and for sensing signals on a respective movable recording medium associated therewith and having means for coupling sensed signals from said first or second mechanisms to said work performing unit thereby to control its movements in response to the sensed signals, and means for operating the recording mechanisms of the apparatus to sense a recorded cycle of signals on a recording medium associated with one of said recording mechanisms and to record the sensed signals onto the recording medium associated with the other recording mechanism; the improvement in said control system, comprising Control means for selectively modifying the transcription of a recorded cycle of signals on the recording medium associated with said one recording mechanism onto the recording medium associated with the other recording mechanism to provide a recorded program of modified movements for said work performing unit.

23. The apparatus claimed in claim 22 wherein said control means includes means for selectively changing the speed of movement of at least one recording medium associated with said recording mechanisms to sense at least a portion of a recorded cycle of signals recorded on one recording medium which is moving at one speed and to record at least said portion of the sensed cycle of signals onto the other recording medium which is moving at a different speed.

* * * * *